United States Patent
Chan

(10) Patent No.: US 11,485,448 B2
(45) Date of Patent: Nov. 1, 2022

(54) ENERGY TRANSFER SYSTEM

(71) Applicant: Super Wheel System Ltd., County Cavan (IE)

(72) Inventor: Kam Sing Chan, County Cavan (IE)

(73) Assignee: Super Wheel System Ltd., County Cavan (IE)

(*) Notice: Subject to any disclaimer, the term of this patent is extended or adjusted under 35 U.S.C. 154(b) by 370 days.

(21) Appl. No.: 16/754,174

(22) PCT Filed: Oct. 25, 2018

(86) PCT No.: PCT/EP2018/079328
§ 371 (c)(1),
(2) Date: Apr. 7, 2020

(87) PCT Pub. No.: WO2019/081664
PCT Pub. Date: May 2, 2019

(65) Prior Publication Data
US 2021/0221466 A1 Jul. 22, 2021

(30) Foreign Application Priority Data
Oct. 26, 2017 (GB) ..................... 1717612

(51) Int. Cl.
*B62M 1/10* (2010.01)
*B60B 1/00* (2006.01)
(Continued)

(52) U.S. Cl.
CPC ............. *B62M 1/105* (2013.01); *B60B 1/003* (2013.01); *B60B 27/0047* (2013.01); *B60B 27/023* (2013.01)

(58) Field of Classification Search
CPC ... B60B 27/023; B60B 27/0047; B60B 1/003; B62M 1/105; F16D 3/62
See application file for complete search history.

(56) References Cited

U.S. PATENT DOCUMENTS

2007/0080012 A1 4/2007 Rastegar
2009/0156318 A1 6/2009 Tashiro

FOREIGN PATENT DOCUMENTS

CA 2514903 A1 * 1/2007 ............ B62M 1/105
DE 2927724 A1 * 1/1981
(Continued)

OTHER PUBLICATIONS

International Search Report dated Feb. 13, 2019 in PCT/EP2018/079328.

*Primary Examiner* — Kip T Kotter
(74) *Attorney, Agent, or Firm* — Vitale Vickrey Niro & Gasey

(57) ABSTRACT

The present invention relates to an energy transfer system, in particular in the form of an energy efficient wheel for use with a vehicle such as a bicycle, which energy transfer system is operable to convert potential energy in the form of the load applied by the weight of the person on the vehicle into kinetic energy in the form of driving torque applied to the wheel, the system including an inner hub and an outer hub eccentrically coupled to the inner hub, in addition to a rim connected to the outer hub via an array of spokes, wherein an actuator comprising a pair of flanges extends radially outwardly from the inner hub and an array of lever arms are hingedly mounted to the outer hub and engaged by the actuator such as to be hingedly displaceable by the actuator in response to relative movement between the inner and outer hubs, and a spring captured between each lever arm and one of the spokes.

20 Claims, 7 Drawing Sheets

(51) Int. Cl.
  *B60B 27/02*    (2006.01)
  *B60B 27/00*    (2006.01)

(56)     References Cited

FOREIGN PATENT DOCUMENTS

FR      324443 A  *  4/1903
FR     2645825 A1    10/1990
GB     2539866 A      1/2017

* cited by examiner

ENERGY TRANSFER SYSTEM

This patent application is a 35 U.S.C 371 national stage application of International Patent Application No. PCT/EP2018/079328, filed on Oct. 25, 2018, which claims priority to United Kingdom Patent Application No. 1717612.4, filed on Oct. 26, 2017. All of these disclosures are hereby expressly incorporated by reference as part of the present disclosure as if fully set forth herein.

FIELD OF THE INVENTION

This invention relates to an energy transfer system, which in particularly preferred embodiment is a in the form of an energy efficient wheel for use with a vehicle, in particular but not exclusively non motor powered vehicles, and most particularly for use with bicycles, which energy transfer system is operable to convert potential energy in the form of the load applied by the weight of the person on the vehicle into kinetic energy in the form of driving torque applied to the wheel.

BACKGROUND OF THE INVENTION

Cycling as a mode of transport is becoming more and more popular, both due to the significant increase in vehicle traffic on our roads and thus increased journey times, in addition to a greater awareness of the health benefits associated with cycling and a generally fitter lifestyle.

With this increased use of bicycles as a mode of transport has come an increase in the variety of bicycles coming on the market to meet the varied needs of these new commuters. For example electric or hybrid bicycles are becoming increasingly popular, in particular to meet the needs of cyclist who have a longer commute and thus desire the assistance provided by an onboard electric motor which can augment or replace the power provided by the cyclist. These electric bicycles are also favoured by cyclist who may have a reduced level of fitness but nevertheless wish to travel by bicycle, whether for the reasons stated above or in an effort to increase their fitness levels.

While electric bicycles have many benefits as set out above, in addition to having zero emissions and are thus a fare more environmentally friendly mode of transport, it is still necessary to ensure that the battery is suitably charged for the journey in question, and this is often not possible, in particular on the return leg of a round trip, where the battery capacity will have been lowered from the outward leg. A suitable charging location is not always available, and in any event the battery on an electric bicycle will have a limited capacity and thus the bicycle will have a limited range, which may make it less suitable for certain journeys. While most modern electric bicycles can be ridden in conventional fashion, for example when the battery has been fully discharged, the addition weight of the battery, motor and associated componentry make the task more difficult than with a conventional bicycle.

It is therefore an object of the present invention to provide a vehicle wheel which is capable of converting a portion of the loading resulting from the weight of a person into torque applied to drive the wheel in order to reduce the rider effort necessary to power the vehicle.

SUMMARY OF THE INVENTION

According to the present invention there is provided an energy transfer system comprising an inner hub; an outer hub; a torque coupling rotatably connecting the inner hub to the outer hub; a rim; an array of spokes connecting the outer hub to the rim; an actuator fixed to the inner hub; an array of lever arms hingedly mounted to the outer hub and with each of which the actuator is engaged; and a spring captured between each lever arm and a respective one of the spokes.

Preferably, the energy transfer system comprises a resiliently deformable stop associated with each lever arm and positioned on the actuator to be engaged and compressed by the lever arm during various stages of displacement of the lever arm by the actuator.

Preferably, the actuator comprises a flange extending from the inner hub and having an array of apertures within which a portion of the respective lever arms is captured.

Preferably, each aperture comprises a substantially circumferentially extending slot.

Preferably, each lever arm comprises an abutment engaged with the actuator.

Preferably, each abutment comprises a bearing engaged with the actuator.

Preferably, the actuator comprises a pair of flanges fixed to and extending radially outwardly from the inner hub in spaced relationship to one another.

Preferably, the outer hub is located between the pair of flanges.

Preferably, each lever arm is substantially L shaped comprising a first leg and a second leg extending therefrom, the lever arm being hingedly mounted to the outer hub at or adjacent a first end of the first leg and the lever arm is engaged with the actuator at a position distal the first end of the first leg.

Preferably, the spring is captured between the respective spoke and the second leg of the lever arm.

Preferably, the spring comprises a compression spring.

Preferably, each spring is arranged to bias the respective lever arm into contact with the actuator such that the inner hub is suspended and supported within the outer hub.

Preferably, the outer hub comprises a pair of annular plates in parallel spaced relationship to one another.

Preferably, the torque coupling is adapted to enable radial movement of the inner hub relative to the outer hub and the simultaneous transmission of torque between the inner hub and the outer hub.

Preferably, the torque coupling comprises an annular torque disc overlying the inner hub and the outer hub and comprising a pair of diametrically opposed first radially extending guideways and a pair of diametrically opposed second radially extending guideways disposed perpendicular to the first guideways; an end cap fixed to the inner hub and overlying the torque disc such as to retain the torque disc in position against the inner and outer hub; a pair of first guides extending from the outer hub into and displaceable along the pair of first guideways and a pair of second guides extending from the end cap into and displaceable along the pair of second guideways.

Preferably, the energy transfer system comprises a torque coupling on each face of the wheel.

Preferably, the actuator defines the or each end cap.

Preferably, the energy transfer system comprises an axle extending axially through the inner hub.

Preferably, the energy transfer system comprises a wheel.

Preferably, the energy transfer system comprises a bicycle wheel.

As used herein, the term "eccentrically coupled" is intended to mean that two rotating component parts are secured to one another in a manner which facilitates simultaneous rotation while also being capable of eccentric displacement relative to one another.

BRIEF DESCRIPTION OF THE DRAWINGS

The present invention will now be described with reference to the accompanying drawings, in which.

DETAILED DESCRIPTION OF THE DRAWINGS

Figure 1:
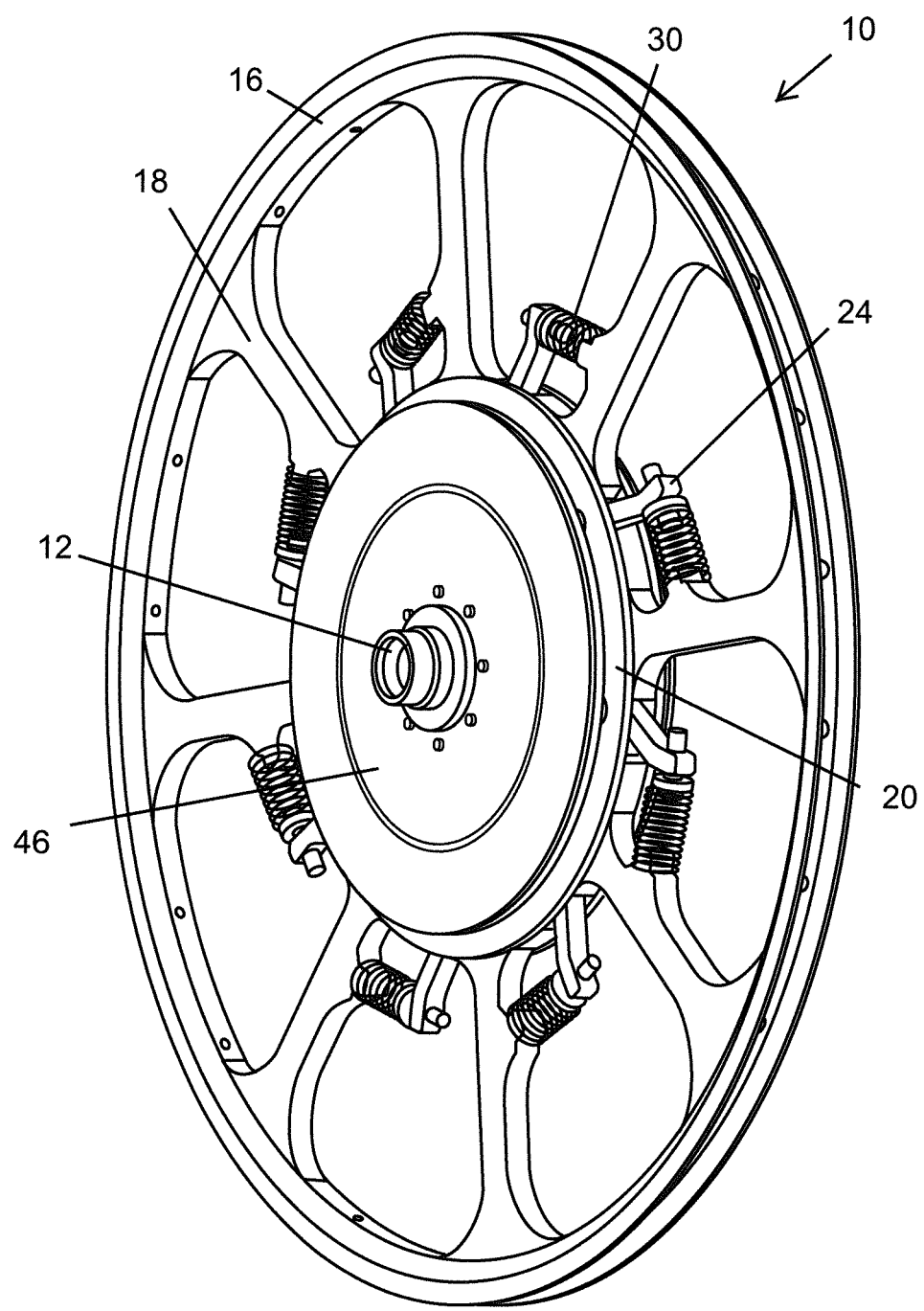
FIG. 1 illustrates a perspective view of an energy transfer system which, according to an embodiment of the present invention, is in the form of a bicycle wheel, and shown from a drive side thereof.
Figure 2:
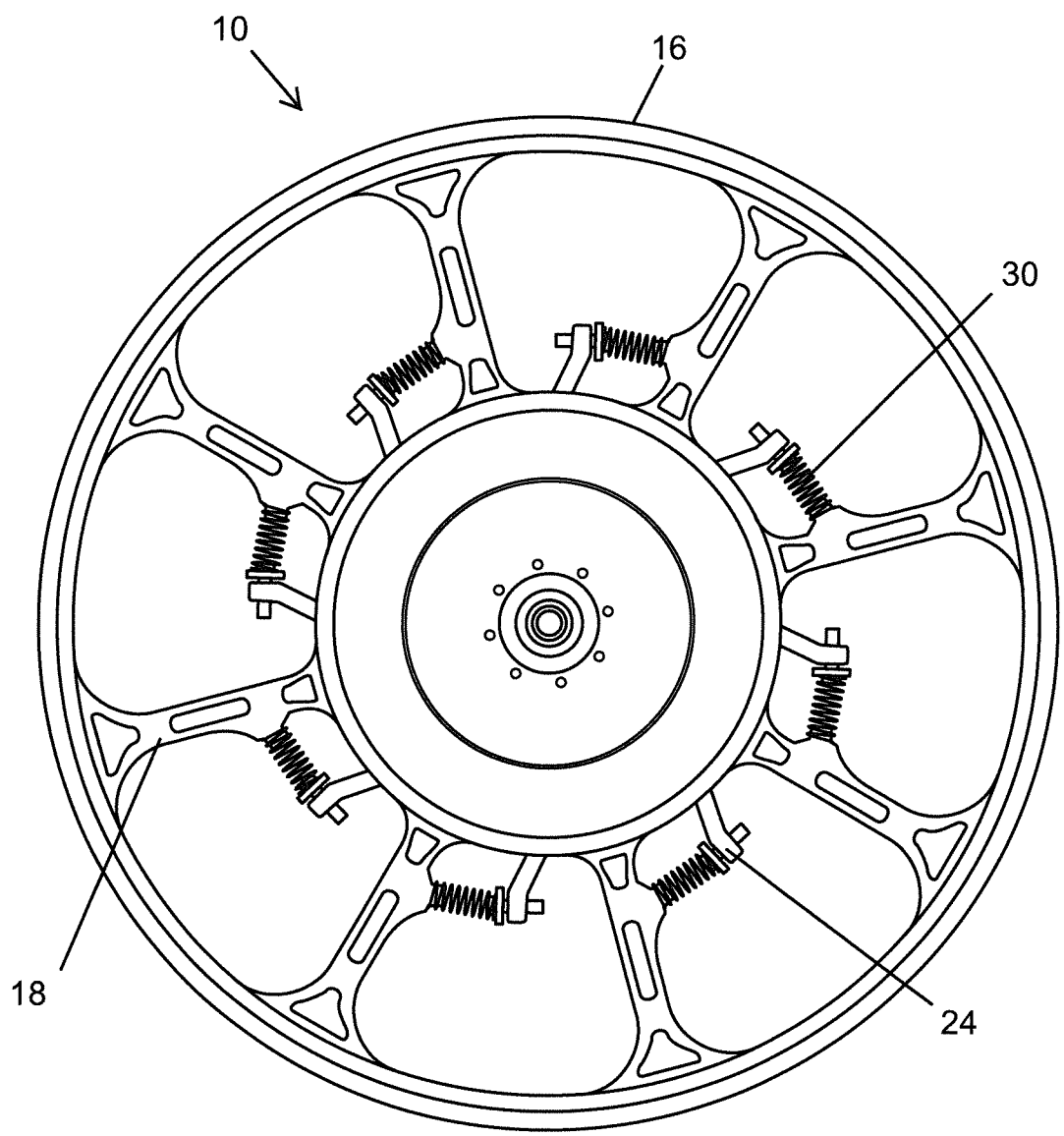
FIG. 2 illustrates a side elevation of the bicycle wheel shown in FIG. 1.
Figure 3:
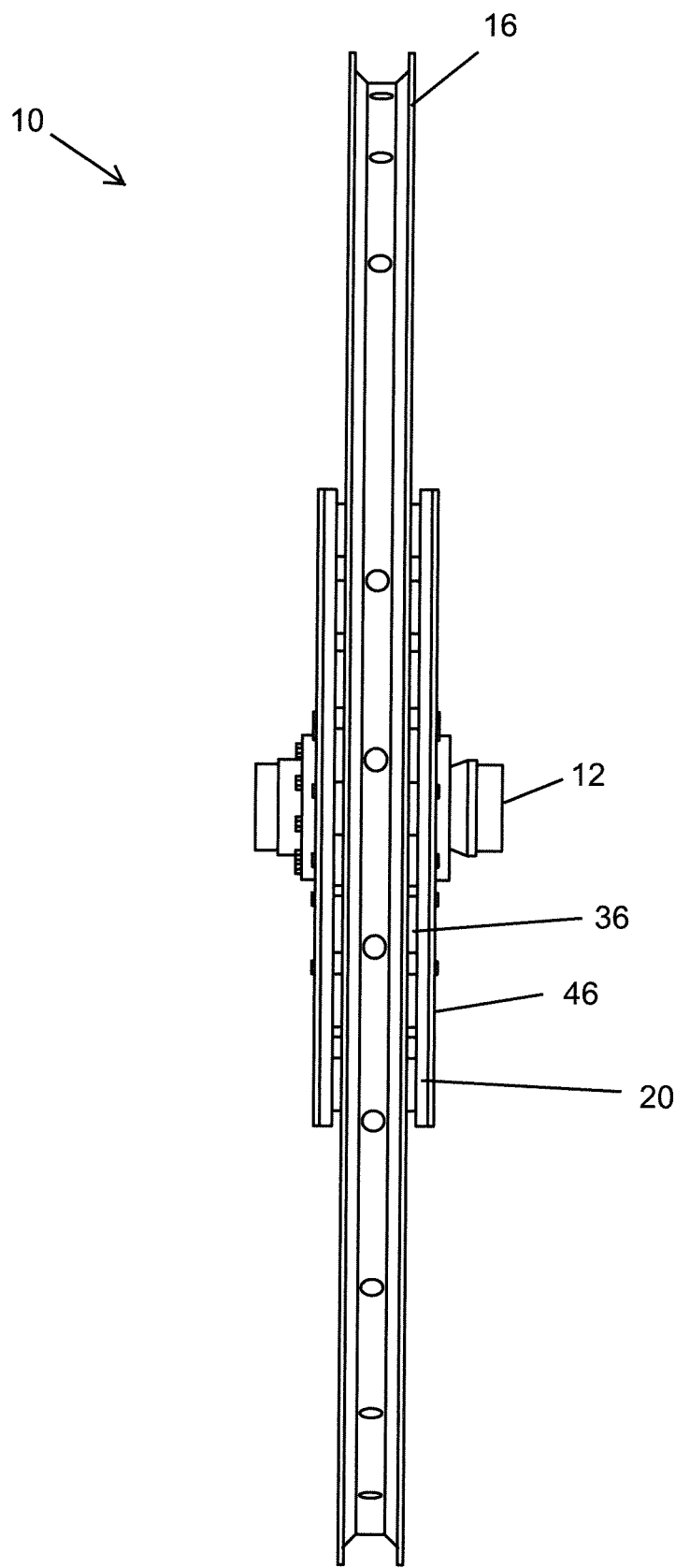
FIG. 3 illustrates an end elevation of the bicycle wheel shown in FIGS. 1 and 2.

Referring now to the accompanying drawings there is illustrated an energy transfer system in the form of a vehicle wheel, generally indicated as 10, which has particular application in human powered vehicles such as bicycles (not shown) or the like, and which wheel 10 is adapted, as hereinafter described, to increase the efficiency of the vehicle by converting potential energy in the form of a portion of the load generated by the weight of a rider and/or occupants of the vehicle into kinetic energy in the form of driving torque applied to the vehicle wheel 10.

In this way it is possible to either reduce the effort required by the rider in powering the vehicle, for example through peddling a bicycle, or to increase the speed at which the vehicle travels for a fixed effort of the rider. It should however be appreciated that the energy transfer system could have alternative applications for converting potential energy into kinetic energy, for example to generate electricity or the like.

The wheel 10 comprises an inner hub 12 which is substantially conventional in configuration and operation, and will normally house an array of bearings (now shown) in order to support the inner hub 12 on an axle (not shown) which axle may or not be removable from the inner hub 12. In use this axle is used to secure the wheel 10 to a frame (not shown) of the bicycle via a convention pair of dropouts in the frame, or by any other suitable means. The inner hub 12 will also, when the wheel 10 is in the form of a bicycle wheel 10, include a conventional freehub (not shown) or freewheel (not shown) onto which one or more cogs may be secured, in order to allow drive to be transmitted to the wheel 10 from the rider via a conventional set of cranks (not shown) or the like, although a motor or the like may also be provided in order to power the bicycle wheel 10 or provide powered assistance 35 to the power generated at the cranks by the rider, as is now common with electric bikes or so called "eBikes". In the majority of bicycles the above drive components, known as the bicycle drivetrain, are located on the right hand side of the bicycle from the perspective of a rider sitting on the bicycle. This side of the bicycle, in particular this side of the rear wheel, is thus known as the "drive" side while the opposed side is known as the "non drive" side.

The wheel 10 further comprises an outer hub 14 circumscribing the inner hub 12, and relative to which the inner hub 12 is radially displaceable, the inner hub 12 and the outer hub 14 however being coupled in a manner which permits torque to be transferred between the outer hub 14 and the inner hub 12 such that the two parts rotate simultaneously, regardless of whether they are concentrically or eccentrically positioned relative to one another, as will be described in greater detail hereinafter.

The wheel 10 also comprises a substantially conventional rim 16 on which, in use, a tube and tyre (not shown) may be fitted in conventional fashion, the rim 16 being fixed to the outer hub 14 by means of an array of rigid spokes 18. Unlike conventional bicycle spokes the spokes 18 are lower in number but greater in size and strength as they are a significant structural part in the transmission of torque to the rim 16 and ultimately in transmitting drive to the ground on which the vehicle wheel 10 is located, again as hereinafter described in detail. The spokes 18 may be solid or hollow and formed from any suitable material such as a metal, for example an aluminium alloy or the like, and in which case may be welded or otherwise secured to both the outer hub 14 and the rim 16. Alternatively the rim 16, spokes 18 and outer hub 14 may be moulded as a single component, whether from metal or a composite such as carbon fibre or the like, which will significantly reduce the weight of the wheel 10 while maintaining a suitable level of strength and stiffness. It will of course be understood from the following description that any other suitable material or combination of materials may be chosen to form these components of the wheel 10.

In the embodiment illustrated the wheel 10 comprises eight of the spokes 18, although it will be appreciated that this number may be increased or decreased, for example depending on the loading to be borne by the wheel 10 in use. The wheel 10 additionally comprises an actuator in the form of a pair of annular flanges 20 secured to and extending radially outwardly from the inner hub 12, one on either side thereof. The annular flanges 20 may be provided as separate components and bolted or otherwise secured to the inner hub 12, or may be provided as integral flanges 20 forming part of and extending radially outwardly from the main shell of the inner hub 12. Each of the flanges 20 includes apertures in the form of an array of circumferentially extending slots 22, the number of slots 22 corresponding to the number of spokes 18, and thus in the embodiment illustrated eight of the slots 22 are provided. Each slot 22 preferably follows a circumferential path so as to define a curved opening or slot 22 in the respective flange 22, for the reasons described hereinafter.

The wheel 10 further comprises a circumferentially arranged array of lever arms 24, one associated with each of the spokes 18 and slots 22, a first end 26 of which is pivotally mounted to the outer hub 14 as hereinafter described in greater detail. The lever arm 24 is substantially L shaped in form, an elbow of the L shaped lever arm 24 being coupled to or engaged by the pair of flanges 20 via a pair of abutments 27, one of which projects laterally outwardly from either side of an elbow region of the lever arm 24 such as to extend into and thus be captured within the respective slot 22. The elbow of each lever arm 24 represents that point furthest from the fulcrum defined by the first end 26 and thus most efficiently utilising the lever effect as hereinafter described. The abutment 27 is preferably defined by a bearing 27 having a diameter just smaller that the width of the slot 22. Thus in use each bearing 27 is captured within one of the slots 22 in the respective flange 20, in order to allow the bearing 27 to travel longitudinally within the slot 22 while minimising friction at the point of connection between each lever arm 24 and the pair of flanges 20. The slot 22 extends substantially circumferentially and is greater in length than the diameter of the bearing 27, allowing said movement of the bearing 27 along the slot 22 during the operation of the wheel 10 as will be described hereinafter. The length of the slot 22 is determined by various factors, most notably the arc of movement the bearing 27 undergoes as the lever arm 24 pivots on the outer hub 14, and thus the dimensions of the lever arm 24 itself.

A second end 28 of the lever arm 24, which extends substantially radially of the wheel 10 and is positioned between an adjacent pair of the spokes 18, is secured to a compression spring 30 which is captured between the second end 28 and one of the adjacent spokes 18. The spring 30 is configured to bias the lever arm 24 away from the spoke 18 and thus to draw the follower 27 radially outwardly against the upper edge of the slot 22, which as hereinafter described acts similarly to the face of a cam to constrain the movement of the bearing 27 and therefore the lever arm 24 of which the bearing 27 is a component part.

Figure 4:
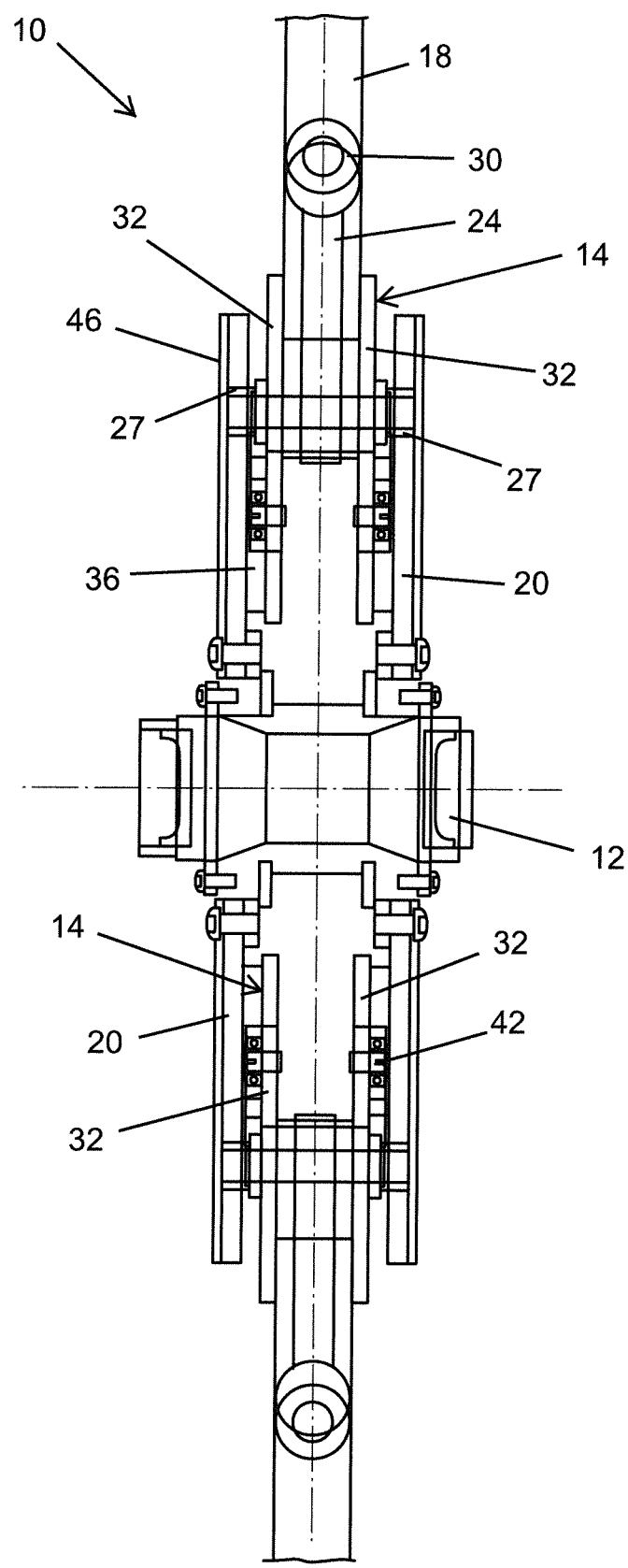
FIG. 4 illustrates a sectioned end elevation of a central portion of the bicycle wheel.
Figure 5:
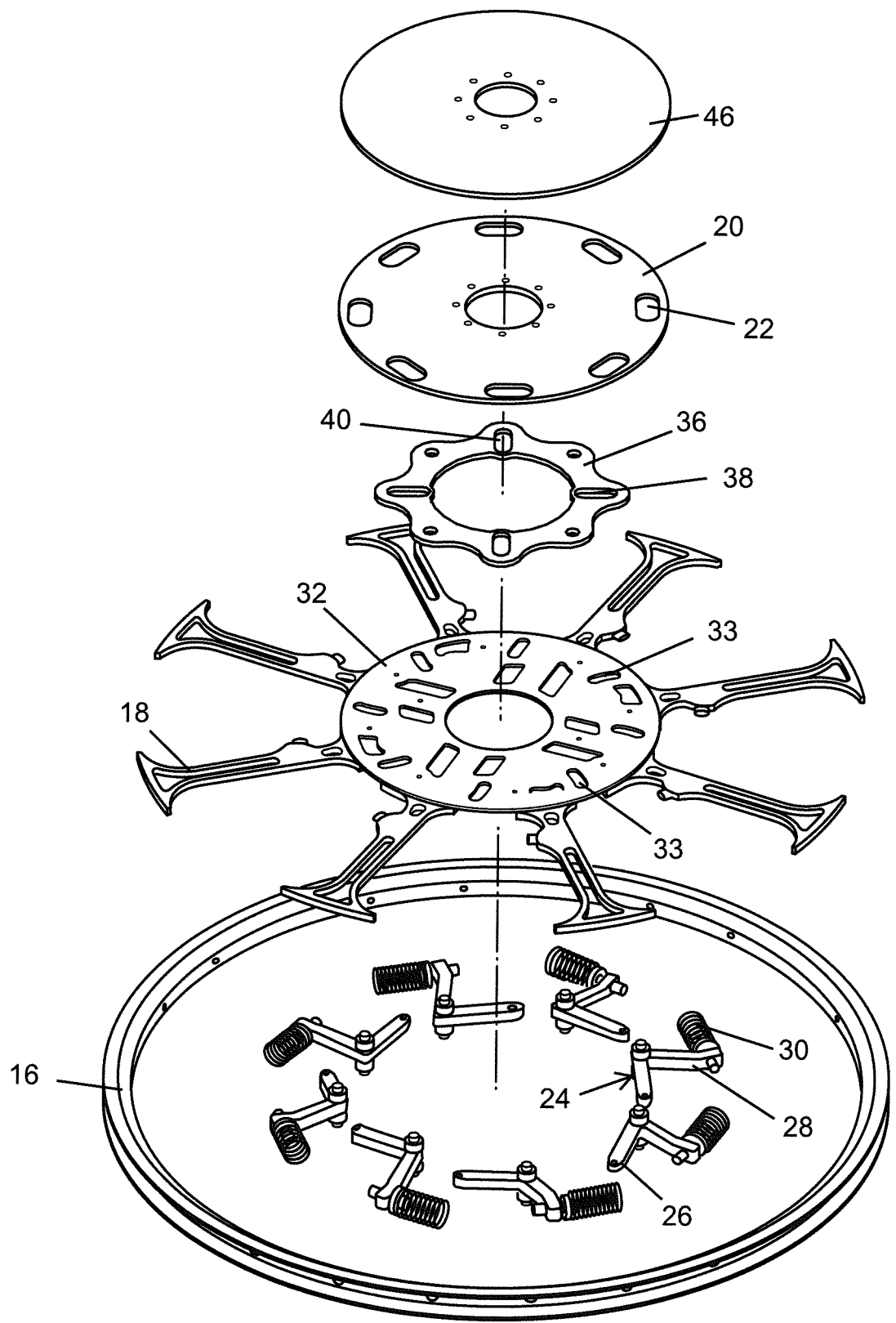
FIG. 5 shows an exploded perspective view from a non drive side of the bicycle wheel, a hub forming part of the wheel being omitted for clarity.
Figure 6:
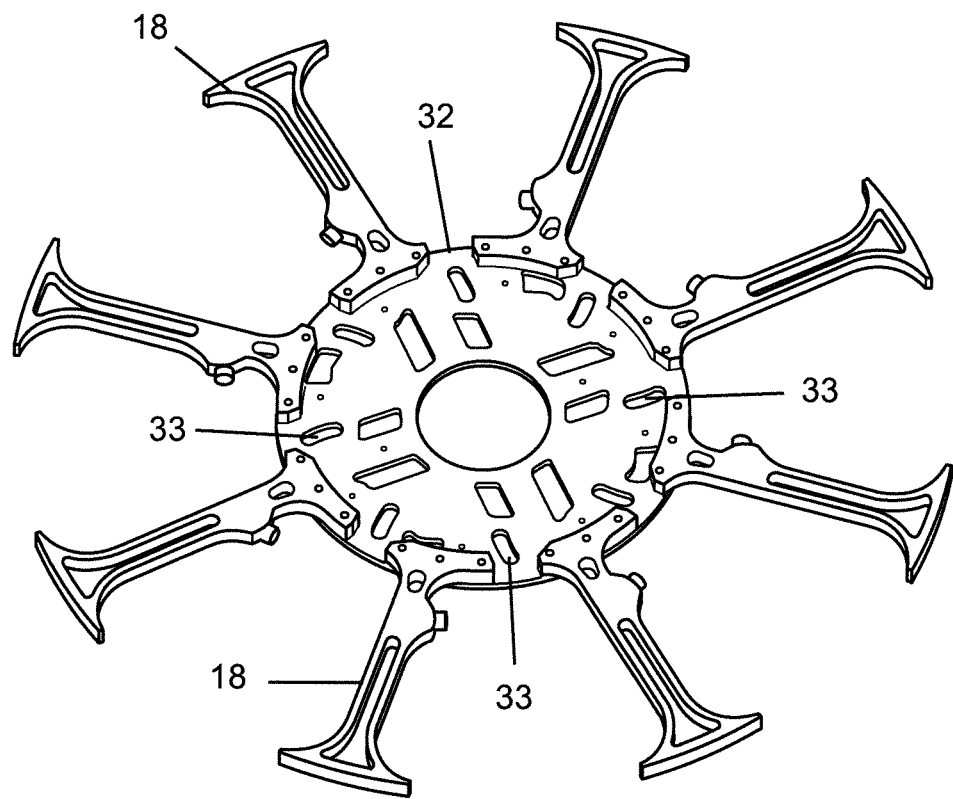
FIG. 6 illustrates a perspective view of one side of an outer hub and connected spokes forming part of the bicycle wheel illustrates in FIGS. 1 to 5.

Referring in particular to FIG. 4, in order to accommodate the lever arms 24 the outer hub 14 is preferably formed as a pair of annular plates 32 in parallel spaced relationship to one another, the space between the plates 32 accommodating the array of lever arms 24. The first end 26 of the lever arm 24 is therefore pivotally captured between the pair of annular plates 32 forming the outer hub 14, for example on a suitable pin or spindle (not shown) extending in an axial direction between the pair of plates 32. Each of the annular plates 32 is provided with an array of radially extending apertures 33 through each of which the supporting spindle (not shown) carrying the respective bearing 27 extends. The pair of flanges 20 sit outboard of the annular plates 32 and the bearings 27 thus pass through the apertures 33 and are captured in the slots 22 which each overlap one of the apertures 33. The apertures 33 are also shaped and dimensioned to accommodate the small amount of movement of the bearing 27 along the slot 22. The shape, location and orientation of the apertures 33 can be more clearly seen in FIGS. 5 and 6. FIG. 5 shows an exploded view of the non drive side of the wheel 10, with the inner hub 12 and drive side components being omitted for clarity. FIG. 6 shows the spokes 18 and non drive side plate 32 of the outer hub 14. In use the array of lever arms 24 are partially captured between the pair of plates 32 forming the outer hub 14, with the second end 28 of each lever arm 24 projecting radially outwardly through a gap defined between adjacent spokes 18.

It will therefore be appreciated that in an unloaded state (no rider on the bicycle) each of the springs 30 act to bias the respective lever arm 24 away from the respective spoke 18 and therefore draw the bearing 27 radially outwardly against the radially outer edge of the respective slot 22, such that the pair of annular flanges 20 are equally loaded about the entire circumference thereof. As a result when the wheel 10 is unloaded the outer hub 14 will be held substantially concentrically about the inner hub 12 in the absence of any external loading applied to the wheel 10. The outer hub 14 and connected rim 16 are therefore essentially floating on the inner hub 12 by means of the circular array of lever arms 24, springs 30 and annular flanges 20. In this unloaded state each bearing 27 is located approximately half way along the length of the respective slot 22.

Figure 7:
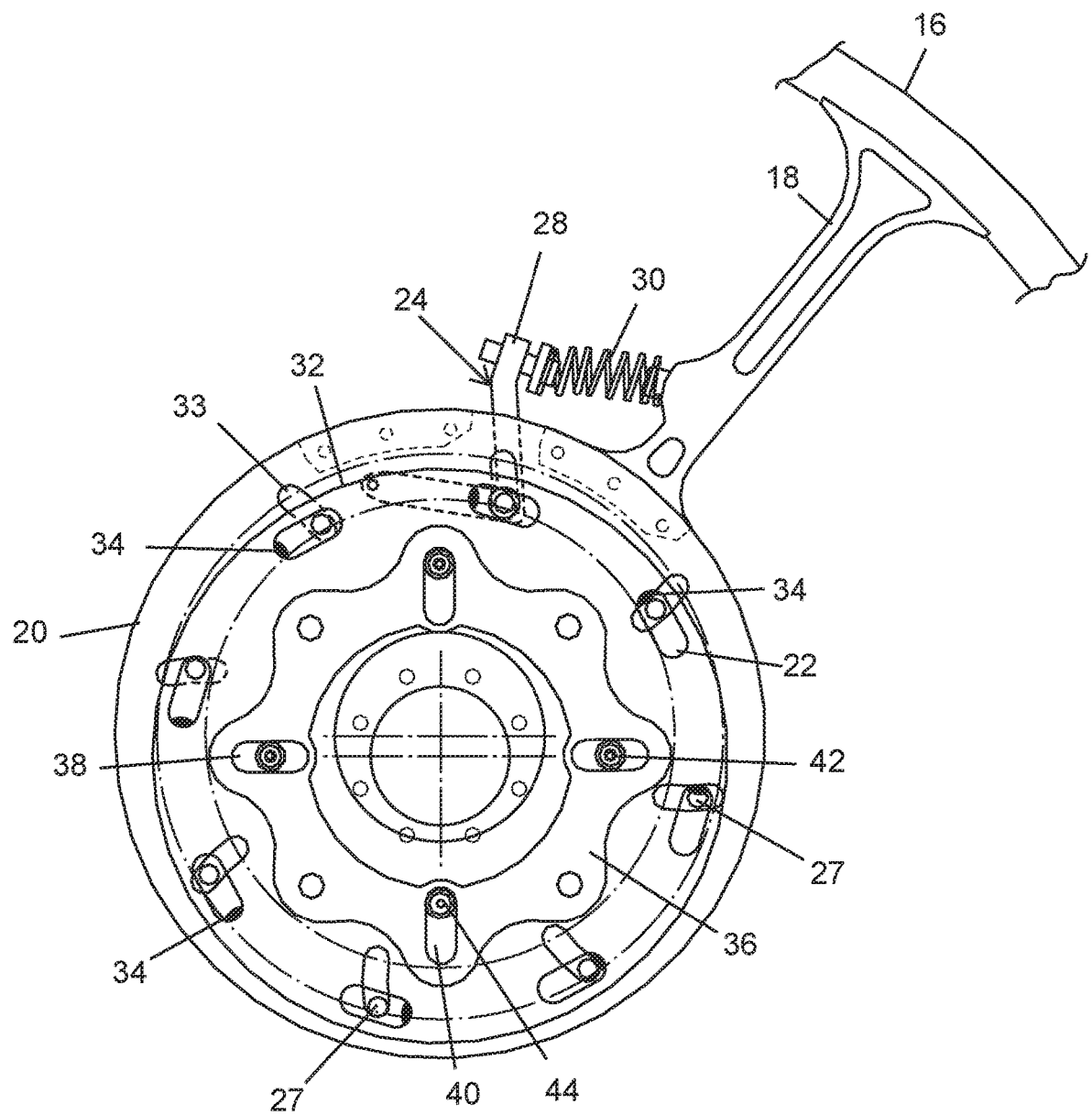
FIG. 7 illustrates a side elevation of a selection of the primary working components of the bicycle wheel of the invention.

Referring in particular to FIG. 7, once a load is applied to the wheel 10, for example when a rider sits onto a bicycle to which the wheel 10 is fitted, the weight of the rider will act downwardly on the wheel 10, in particular via the inner hub 12 which will be fixed to the bicycle frame via the axle (not shown) in known fashion. This weight based load will act substantially vertically downward under the influence of gravity, pressing the inner hub 12 downwardly while the outer hub 14, rigidly connected to the rim 16 via the spokes 18 and therefore supported by the ground on which the wheel 10 is located, will remain fixed in its vertical position.

As the inner hub 12 moves downwardly relative to the outer hub 14, the pair of flanges 20 which are fixed to the inner hub 12 will thus also move downwardly, resulting in relative movement between the inner hub 12 and outer hub 14. The lower half of the inner hub 12 will thus move towards the lower half of the outer hub 14, while the upper half of the inner hub 12 will move away from the upper half of the outer hub 14. During this relative movement the bearings 27 remain captured within the slots 22 of the flanges 20 of the inner hub 12, the bearings 27 being connected to the outer hub 14 via the lever arms 24. As a result a radially inwardly acting force will be applied by the flanges 20 to the bearings 27 located along the upper region of the wheel 10, while a radially outwardly acting force will be applied to the bearings 27 located along the lower region of the wheel 10. These forces are greatest towards the top and bottom positions on the wheel 10 where the greatest relative displacement between the inner hub 12 and out hub 14 occurs, and thus at the so called twelve o'clock and six o'clock positions of the bearings 27. Along the upper region the forces will gradually reduce between the twelve o'clock and three o'clock positions, with essentially no forces being exerted between the three o'clock and nine o'clock positions, as described in greater detail hereinafter.

This will force those lever arms 24 about the upper portion of the wheel 10 to rotate radially inwardly in the direction of the applied force, displacing the second end 28 towards the associated spoke 18 such as to compress the spring 30 against the spoke 18, thereby resulting in the spring 30 applying a reactive force to the spoke 18. This reactive force, acting tangentially to and at a distance from the central axis of the outer hub 14, will act to rotate the outer part of the wheel 10 comprising the spokes 18, rim 16 and outer hub 14, thus effectively applying a torque to this outer portion of the wheel 10 which serves, in use, to drive the wheel 10, effectively converting a portion of the weight of the person into forward motion or drive. The rotational displacement of the lever arm 24 results in the displacement of the respective bearing 27 in an anticlockwise direction when viewed from the drive side of the wheel 10, towards a left hand end of the respective slot 22. In order to provide a resistance or backstop against the reactive force generated by the spring 30, to ensure the reactive force is transmitted into rotation or toque applied to the rim 16 via the respective spoke 18, each slot 22 incorporates a resiliently deformable stop in the form of a rubber bumper 34 seated in the left hand side of the slot 22 when viewed from the drive side of the wheel 10. The bumper 34 is located and dimensioned such as to be initially contacted by the bearing 27 when the slot 22 is approximately at the twelve o'clock position, to ensure that the reactive force acts between the outer hub 14 and the inner hub 12. As each slot 22 and bearing 27 rotate towards the three o'clock position, the bearing 27 will undergo further displacement along the slot 22 in the direction of the bumper 34, which while allowing this displacement provides resistance to ensure that the reactive force generated by the spring 30 is directed through the spoke 18 to drive the wheel 10. After the three o'clock position the bearing 27 begins to move away from and out of contact with the bumper 34 back towards the centre of the slot 22, pivoting the lever arm 24 such as to relax the respective spring 30, and so the resistance provided by the bumper 34 is no longer required as there is no reactive force being generated by the spring 30 to be transmitted to the rim 16. Between the three o'clock position and the six o'clock position the bearing 27 will move to the centre point of the slot 22. It should be appreciated that the size and shape of the bumper 34 may be varied as required, and could also for example be in the form of a spring or the like which provided the requisite resistance to the further displacement of the bearing 27.

As the wheel 10 rotates during forward movement of the associated vehicle (not shown) each of the slots 22 will sequentially rotate from the six o'clock position upwardly into the upper most position as the flanges 20 rotate with the inner hub 12, wherein the respective lever arm 24 will be forced to rotate and compress the associated spring 30, thus applying a force to the connected spoke 18. This force gradually increases from the nine o'clock position to the twelve o'clock position where the spring 30 experiences maximum compression, before again being transmitted through the spoke 18 to drive the wheel 10, as the wheel moves from the twelve to the three o'clock position. In this way a torque is continuously applied to the outer portion of the wheel 10, predominantly between the twelve and three o'clock positions, the upper portion of the wheel 10 not being in contact with the ground and thus is not captured between the outer hub 14 and the ground like the lower portion of the wheel 10. Applying this force to the spokes 18 at the lowermost portion of the wheel 10 would result in a lateral force being exerted against the spokes 18 as opposed to the torque that is applied to the upper portion of the wheel, which is free to rotate.

As each slot 22 rotates clockwise from the upper most position towards and into the lowermost or so called six o'clock position, the relative positioning between the flanges 20 and the outer hub 14 will have altered such that the slots 22 will have pushed the bearings 27 radially outward and thus the lever arm 24 at the lowermost or six o'clock position will have pivoted the second end 28 away from the associated spoke 18 resulting in a relaxing of the spring 30 such that no force is applied against the spoke 18 when in this lowermost position. It will be appreciated that the force applied against the spokes 18 will reduced gradually from the maximum force at the uppermost or twelve o'clock position to an absence of force at the lowermost or six o'clock position, with the greatest reactive force being present between the twelve o'clock and three o'clock positions.

As the torque is applied via the spokes 18 to the rim 16, and this outer portion of the wheel 10 is not rigidly connected to the inner hub 12, it is a requirement to torsionally couple the inner hub 12 and the outer hub 14 in order to ensure that these two parts of the wheel do not rotate relative to one another, which would render the wheel 10 inoperable. Torque coupling between these two parts of the wheel 10 is also required to facilitating the conventional transmission of torque as will be applied by the rider via the vehicle drivetrain (not shown) from the inner hub 12 to the outer hub 14 and from there via the spokes 18 and rim 16 to the ground to effect forward motion of the associated vehicle.

The wheel 10 therefore comprises a torque coupling, preferably on each side of the wheel 10, which torque coupling comprises a torque disc 36 which is held in place against the respective side of the wheel 10 by means of the respective flange 20 which effectively defines an end cap in order to capture or sandwich the torque disk 36 between the flange 20 and the lateral face of the wheel 10 as defined by the respective annular plate 32 of the outer hub 14. The torque disc 36 comprises an opposed pair of radially extending first guideways 38 and a perpendicularly disposed radially extending opposed pair of second guideways 40. The torque coupling further comprises a corresponding pair of first guides 42 fixed to and projecting outwardly from the outer hub 14 and captured within the first guideways 38, in addition to a pair of second guides 44 fixed to and projecting outwardly from the flange 20 and captured within the second guideways 40. The guideways 38, 40 and guides 42, 44 are positioned such that when the wheel 10 is unloaded and thus the outer hub 14 is positioned concentrically about the inner hub 12 the guides 42, 44 are positioned approximately half way along the respective guideways 38, 40. This arrangement allows for the eccentric coupling or movement between the inner hub 12 and the outer hub 14 while retaining the ability to transmit torque between these two parts of the wheel 10.

In this way, although the outer portion of the wheel 10 as defined by the rim 16, spokes 18 and the outer hub 14 is suspended about the inner hub 12 by means of the lever arms 24 and springs 30, and thus will when loaded, be eccentrically disposed about the inner hub 12, torque can nevertheless be transmitted between the inner hub 12 and the outer hub 14. The torque discs 36 essentially float between the inner hub 12 and outer hub 14, with the guideways 38, 40 permitting the radial movement of the torque discs 36 while also effecting, via the first and second guides 42, 44, the transmission of torque between the two parallel but not coaxial rotating hubs 12, 14. During rotation of the wheel 10 the torque discs 36 transmit torque from the inner hub 12 via the flange 20 and second guides 44 to the outer hub 14 via the first guides 42. Each torque disc 36 traces a circular orbit during rotation of the wheel 10, a centre point of the torque disc 36 tracing the circular orbit around the mid point between the input and outputs, namely the inner hub 12 and outer hub 14. The torque disc 36 has an enlarged central opening in order to facilitate this orbital motion without coming into contact with the inner hub 12. The eccentric positioning of the inner hub 12, outer hub 14 and toque disc 36 is illustrated in FIG. 7.

A cover plate 46 is preferably provided on each side of the wheel 10 to overlie the respective flange 20 and thus occlude the slots 22 and bearings 27 for both aesthetic reasons, and to provide a level of protection to the working components against the ingress of damaging objects or debris or the like.

It will be appreciated that the spring rate of the springs 30 may require adjustment for optimal performance depending on the weight of the load being borne by the wheel 10, for example as dictated by the weight of a bicycle rider. Thus each spring 30 may be provided with an adjustable tensioner (not shown) which may be manually adjusted, whether with an appropriate tool or by hand, in order to increase or decrease the spring rate of each of the springs 30. It will also be appreciated that the dimensions of the lever arms 24 may be varied as required in order to provide the appropriate operation of the vehicle wheel 10 as hereinbefore described.

The energy transfer system, in the form of the vehicle wheel 10, of the present invention therefore provides a means of supplementing the conventional power provided by the operator of a human powered vehicle by converting a portion of the weight of the operator into torque applied to the vehicle wheel 10.

The invention is not limited to the embodiment described herein but can be amended or modified without departing from the scope of the present invention. For example the energy transfer system according to the invention could be used to convert potential energy into electricity or the like, or the effect or assist in the displacement of internal drive components or the like not directly associated with motion of the system.

The invention claimed is:

1. An energy transfer system comprising an inner hub; an outer hub; a torque coupling rotatably connecting the inner hub to the outer hub; a rim; an array of spokes connecting the outer hub to the rim; an actuator fixed to the inner hub; an array of lever arms hingedly mounted to the outer hub and with each of which the actuator is engaged; and a spring captured between each lever arm and a respective one of the spokes.

2. An energy transfer system according to claim 1 comprising a resiliently deformable stop associated with each lever arm and positioned on the actuator to be engaged and compressed by the lever arm during various stages of displacement of the lever arm by the actuator.

3. An energy transfer system according to claim 1 in which the actuator comprises a flange extending from the inner hub and having an array of apertures within which a portion of the respective lever arms is captured.

4. An energy transfer system according to claim 3 in which each aperture comprises a substantially circumferentially extending slot.

5. An energy transfer system according to claim 1 in which each lever arm comprises an abutment engaged with the actuator.

6. An energy transfer system according to claim 5 in which each abutment comprises a bearing engaged with the actuator.

7. An energy transfer system according to claim 1 in which the actuator comprises a pair of flanges fixed to and extending radially outwardly from the inner hub in spaced relationship to one another.

8. An energy transfer system according to claim 7 in which the outer hub is located between the pair of flanges.

9. An energy transfer system according to claim 1 in which each lever arm is substantially L shaped comprising a first leg and a second leg extending therefrom, the lever arm being hingedly mounted to the outer hub at or adjacent a first end of the first leg and the lever arm is engaged with the actuator at a position distal the first end of the first leg.

10. An energy transfer system according to claim 9 in which the spring is captured between the respective spoke and the second leg of the lever arm.

11. An energy transfer system according to claim 1 in which the spring comprises a compression spring.

12. An energy transfer system according to claim 1 in which each spring is arranged to bias the respective lever arm into contact with the actuator such that the inner hub is suspended and supported within the outer hub.

13. An energy transfer system according to claim 1 in which the outer hub comprises a pair of annular plates in parallel spaced relationship to one another.

14. An energy transfer system according to claim 1 in which the torque coupling is adapted to enable radial movement of the inner hub relative to the outer hub and the simultaneous transmission of torque between the inner hub and the outer hub.

15. An energy transfer system according to claim 14 in which the torque coupling comprises an annular torque disc overlying the inner hub and the outer hub and comprising a pair of diametrically opposed first radially extending guideways and a pair of diametrically opposed second radially extending guideways disposed perpendicular to the first guideways; an end cap fixed to the inner hub and overlying the torque disc such as to retain the torque disc in position against the inner and outer hub; a pair of first guides extending from the outer hub into and displaceable along the pair of first guideways and a pair of second guides extending from the end cap into and displaceable along the pair of second guideways.

16. An energy transfer system according to claim 15 in which the actuator defines the or each end cap.

17. An energy transfer system according to claim 1 comprising a torque coupling on each face of the wheel.

18. An energy transfer system according to claim 1 comprising an axle extending axially through the inner hub.

19. An energy transfer system according to claim 1 comprising a wheel.

20. An energy transfer system according to claim 19 comprising a bicycle wheel.

* * * * *